(12) United States Patent
Bunzel et al.

(10) Patent No.: US 8,798,354 B1
(45) Date of Patent: Aug. 5, 2014

(54) METHOD AND SYSTEM FOR AUTOMATIC CORRELATION OF CHECK-BASED PAYMENTS TO CUSTOMER ACCOUNTS AND/OR INVOICES

(75) Inventors: Breeana D. Bunzel, Cupertino, CA (US); Akbar A. Rangara, San Jose, CA (US); Kai Chun Chan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 160 days.

(21) Appl. No.: 13/455,692

(22) Filed: Apr. 25, 2012

(51) Int. Cl.
*G06K 9/00* (2006.01)

(52) U.S. Cl.
USPC .......................................................... 382/137

(58) Field of Classification Search
None
See application file for complete search history.

(56) References Cited

U.S. PATENT DOCUMENTS 5,917,931 A * 6/1999 Kunkler ......................... 382/137
2004/0260636 A1 * 12/2004 Marceau et al. ................ 705/35

* cited by examiner

*Primary Examiner* — Atiba O Fitzpatrick
(74) *Attorney, Agent, or Firm* — Hawley Troxell Ennis & Hawley LLP; Philip McKay

(57) ABSTRACT

An optical image of a check submitted to a business as part a check-based financial transaction is obtained and the optical image of the check is scanned using Optical Character Recognition (OCR) technology to obtain optical image-based financial transaction data. The optical image-based financial transaction data is then used to automatically match, or correlate, the check to a customer account and/or invoice and, pending user review and/or approval, a payment entry is automatically generated and the check-based payment represented by the check is automatically credited to the customer account and the customer account balance is transformed to reflect the check-based payment, and/or the status of an associated invoice is transformed to reflect the check-based payment, e.g., the invoice is marked as paid, or partially paid.

24 Claims, 2 Drawing Sheets

METHOD AND SYSTEM FOR AUTOMATIC CORRELATION OF CHECK-BASED PAYMENTS TO CUSTOMER ACCOUNTS AND/OR INVOICES

BACKGROUND

Currently, several business financial management systems are available to help a business perform various business financial management functions such as, but not limited to, invoicing and accounts receivable management, expense and bill payment management, customer management, payroll management, inventory management, and tax preparation.

Typically a business financial management system's ability to perform and automate as much of the various business financial management functions, and business related financial transactions, is of most interest/value to the business/user.

However, while many financial transactions involving individual consumers do generate mostly electronic financial transaction data, many financial transactions in a business setting still rely on the use of paper checks. Currently, these check-based transactions are largely excluded from automated processing using currently available business financial management systems because while currently available business financial management systems are quite capable of processing electronic data representing business related financial transactions, the printed, or hard-copy, data presented on a paper check is not readily processed by currently available business related financial management systems.

As a result, currently, the data related to a check-based financial transaction, such as payee, payment amount, date, etc., must be manually entered into the financial management systems and then the processing of the check-based payments to correlate and credit the check-based payments to customer accounts and/or outstanding invoices must once again be handled in a largely manual manner.

Consequently, currently, a user must first manually obtain the check, or, at best, an image of the check. Then the user must visually examine the check, or image of the check, to determine the transactional information associated with the check, such as the party submitting the check as payment, i.e., the payor, and the amount of the check. Then the user must manually make the correlation between the check and the specific invoice and/or customer account. Then the user must access the customer account associated with the determined payor, and/or any specific invoice for which the check-based payment was tendered. Finally, the user must make a payment entry in the financial management system indicating the received payment, and often enter various check data such as the check number, date, and amount.

Clearly the current process described above for processing check-based payments to the business and correlating and crediting the check-based payments to customer accounts and/or outstanding invoices is a labor intensive process that can consume significant business resources and time. This is particularly evident when it is considered that most businesses routinely receive significant numbers of check-based payments from multiple customers for multiple invoices.

What is needed is an efficient and largely automated process for correlating check-based payments with the customer accounts and/or invoices to which the check-based payments should be applied and making payment entries within a business financial management system.

SUMMARY

In accordance with one embodiment, a system and method for automatic correlation of check-based payments to customer accounts and/or invoices includes a process for automatic correlation of check-based payments to customer accounts and/or invoices whereby an optical image of a check submitted to a business as part a check-based financial transaction is obtained.

In one embodiment, the optical image of the check is scanned using Optical Character Recognition (OCR) technology to obtain optical image-based financial transaction data such as, but not limited to, one or more of: the payor name; the check amount; the customer bank account upon which the check will be drawn; a customer account associated with the payor written on the check; and/or an associated invoice number written on the check.

In one embodiment, the optical image-based financial transaction data is then used to automatically match, or correlate, the check to a customer account and/or invoice.

In one embodiment, pending user review and/or approval, a payment entry is then automatically generated and the check-based payment represented by the check is automatically credited to the customer account and the customer account balance is transformed to reflect the check-based payment, and/or the status of an associated invoice is transformed to reflect the check-based payment, e.g., the invoice is marked as paid, or partially paid.

Using the system and method for automatic correlation of check-based payments to customer accounts and/or invoices discussed herein, a business is provided an efficient and highly automated means for correlating check-based payments with the customer accounts and/or invoices to which the check-based payments should be applied and for making automated payment entries reflecting the check-based payments.

Figure 1:
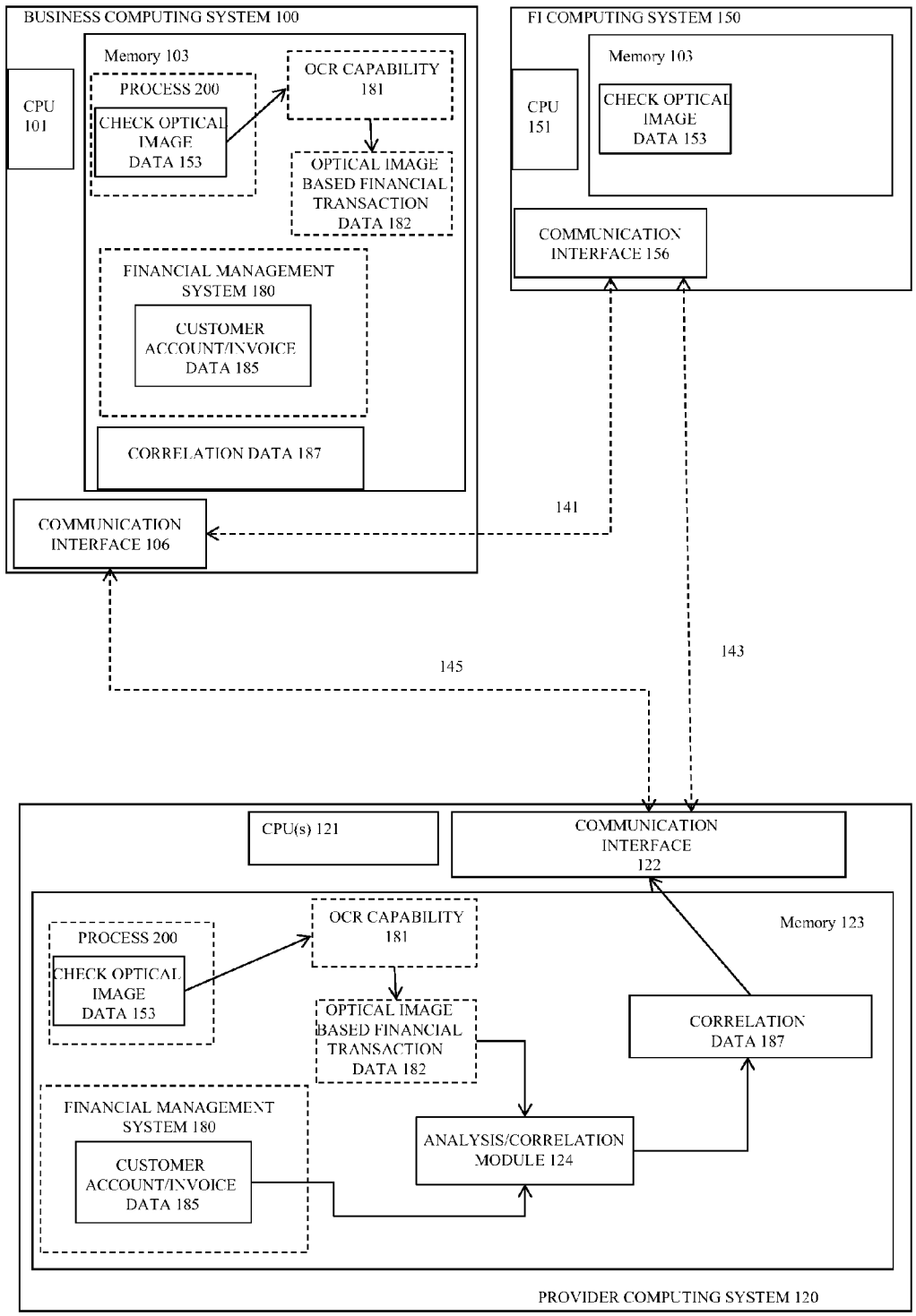
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for automatic correlation of check-based payments to customer accounts and/or invoices includes a process for automatic correlation of check-based payments to customer accounts and/or invoices.

In one embodiment, the process for automatic correlation of check-based payments to customer accounts and/or invoices is implemented on one or more computing systems as part of, and/or is associated with, a business financial management system.

In one embodiment, the process for automatic correlation of check-based payments to customer accounts and/or invoices is implemented on one or more computing systems as an add-on module or functionality associated with a business financial management system.

In one embodiment, the process for automatic correlation of check-based payments to customer accounts and/or invoices is a standalone application implemented on one or more computing systems.

As used herein, the term "computing system" includes, but is not limited to: a desktop computing system; a mobile computing system; a workstation; a two-way pager; a cellular telephone; a smart phone; a digital wireless telephone; a tablet computing system; a notebook computing system; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile computing system" and "mobile device" are used interchangeably to denote a sub-set of the term "computing system" including, but not limited to: a portable computer; a tablet computing system; a notebook computing system; a laptop computing system; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Herein, a business financial management system can be, but is not limited to, any data management system implemented on a computing system and/or accessed through a network that gathers business financial data, including business financial transactional data, from one or more sources and/or has the capability to analyze, process, and categorize at least part of the business financial data.

As used herein, the term business financial management system includes, but is not limited to: computing system implemented, and/or online, business financial management systems, packages, programs, modules, or applications; computing system implemented, and/or online, business tax preparation systems, packages, programs, modules, or applications; computing system implemented, and/or online, business accounting and/or invoicing systems, packages, programs, modules, or applications; and various other business electronic data management systems, packages, programs, modules, or applications, whether known at the time of filling or as developed later.

Specific examples of business financial management systems include, but are not limited to: QuickBooks™, available from Intuit, Inc. of Mountain View, Calif.; QuickBooks On-line™, available from Intuit, Inc. of Mountain View, Calif.; and/or various other business financial management systems discussed herein, and/or known to those of skill in the art at the time of filing, and/or as developed after the time of filing.

In one embodiment, an optical image of a check submitted to a business as part a check-based financial transaction is obtained.

Herein the term "check" includes any document or other mechanism used as a payment means associated with a financial transaction. As specific examples, herein the term "check" includes, but is not limited to, a personal check, a business check, a money order, a cashier's check, or any other form of payment used in any financial transaction.

In various embodiments, the check is handwritten. In other embodiments, the check is printed, and/or otherwise, machine generated. In various embodiments, the check includes handwritten or printed check-based financial transaction data, such as handwritten or printed data indicating the party writing the check, i.e., handwritten or printed data indicating the payor, handwritten or printed data indicating the payee, handwritten or printed data indicating the payment amount, handwritten or printed data indicating the date, handwritten or printed data indicating the bank account number, handwritten or printed data indicating the routing number, handwritten or printed memo data, etc.

In one embodiment, the optical image of the check submitted to the business as part a check-based financial transaction is obtained through, or provided to, the business financial management system associated with the process for automatic correlation of check-based payments to customer accounts and/or invoices.

In one embodiment, the optical image of the check submitted to the business as part a check-based financial transaction is obtained from a financial institution, such as a bank or credit union associated with the business, and/or the business financial management system associated with the process for automatic correlation of check-based payments to customer accounts and/or invoices.

Currently many financial institutions provide various on-line, or web-based, account access and interaction features. Currently, these on-line, or web-based, account access and interaction features typically include providing the user access to a listing of financial tractions involving the user's accounts, such as payments made into the accounts and withdraws made from the accounts. In addition, many financial institutions now include optical images of checks associated the listed financial transactions.

In one embodiment, the optical image of the check submitted to the business as part a check-based financial transaction and deposited into a financial institution account associated with the business is obtained/downloaded from the financial institution using electronic data transfer systems such as the Open Financial Exchange (OFX) specification, or various other systems for transferring financial transaction data.

In one embodiment, the optical image of the check submitted to the business as part a check-based financial transaction and deposited into a financial institution account associated with the business is obtained/downloaded from the financial institution through the business financial management system associated with the process for automatic correlation of check-based payments to customer accounts and/or invoices.

In other embodiments, the optical image of the check submitted to the business as part a check-based financial transaction is obtained/downloaded by the process for automatic correlation of check-based payments to customer accounts and/or invoices, and/or the business financial management system associated with the process for automatic correlation of check-based payments to customer accounts and/or invoices, using any method, means, process, or procedure for obtaining or downloading the optical image of a check as discussed herein, and/or as known in the art at the time of filing, and/or as developed after the time of filing.

In one embodiment, once obtained/downloaded, the optical image of the check is scanned using Optical Character Recognition (OCR) technology, and/or any similar pattern matching technology. In one embodiment, OCR technology, and/or pattern matching technology, is used to extract optical image-based financial transaction data from the optical image of the check by transforming the handwritten, or printed, check-based financial transaction data included in the obtained optical image of the check into electronic optical image-based financial transaction data readable, and usable, by a business financial management system, and/or one or more processors, in the same way electronic transaction data for electronic transactions is currently processed.

In one embodiment, the optical image-based financial transaction data includes various data such as, but not limited to, one or more of: data indicating the payor name; data indicating the check amount; data indicating the customer bank account upon which the check will be drawn; data indicating a customer account associated with the payor written/printed on the check; and/or data indicating an associated invoice number written/printed on the check.

In one embodiment, the optical image-based financial transaction data is stored. In one embodiment, the optical image-based financial transaction data is then used to match, or correlate, the check to a customer account and/or invoice.

In one embodiment, the optical image-based financial transaction data is provided to the business financial management system associated with the process for automatic correlation of check-based payments to customer accounts and/or invoices and is used to match, or correlate, the check to a customer account within the business financial management system associated with the process for automatic correlation of check-based payments to customer accounts and/or invoices and/or an invoice, or invoices, generated by the business financial management system associated with the process for automatic correlation of check-based payments to customer accounts and/or invoices.

In one embodiment, the optical image-based financial transaction data is provided to the business financial management system associated with the process for automatic correlation of check-based payments to customer accounts and/or invoices and is used to match, or correlate, the check to a customer account and/or invoice under the direction of one or more processors associated with one or more computing systems.

In one embodiment, the optical image-based financial transaction data indicating the payor name associated with the check is used, at least in part, to match, or correlate, the check to a customer account and/or invoice under the direction of one or more processors associated with one or more computing systems.

In one embodiment, the optical image-based financial transaction data indicating the amount associated with the check is used, at least in part, to match, or correlate, the check to a customer account and/or invoice under the direction of one or more processors associated with one or more computing systems.

In one embodiment, the optical image-based financial transaction data indicating the customer bank account upon which the check will be drawn is used, at least in part, to match, or correlate, the check to a customer account and/or invoice under the direction of one or more processors associated with one or more computing systems.

In one embodiment, the optical image-based financial transaction data indicating a customer account associated with the payor as written or printed on the check is used, at least in part, to match, or correlate, the check to a customer account and/or invoice under the direction of one or more processors associated with one or more computing systems.

In one embodiment, the optical image-based financial transaction data indicating an associated invoice number as written or printed on the check is used, at least in part, to match, or correlate, the check to a customer account and/or invoice under the direction of one or more processors associated with one or more computing systems.

In various embodiments, any combination of one or more of the optical image-based financial transaction data discussed above, and/or any other optical image-based financial transaction data discussed herein, and/or as known in the art at the time of filing, and/or as developed/made available after the time of filing is used, at least in part, to match, or correlate, the check to a customer account and/or invoice under the direction of one or more processors associated with one or more computing systems.

In various embodiments, a margin of optical image-based financial transaction data and customer account and/or invoice match error is defined such that a near match between the optical image-based financial transaction data and the customer account and/or invoice is identified as a potential match subject to additional user review.

In one embodiment, a threshold optical image-based financial transaction data and customer account and/or invoice match score is defined and the optical image-based financial transaction data associated with a given check is assigned an optical image-based financial transaction data and customer account and/or invoice match score with respect to a potential customer account and/or invoice. In one embodiment, optical image-based financial transaction data associated with a given check having an optical image-based financial transaction data and customer account and/or invoice match score greater than the threshold optical image-based financial transaction data and customer account and/or invoice match score is identified as an actual, or potential, match subject to additional user review.

In one embodiment, a listing of the optical image-based financial transaction data associated with the check and the matched customer account and/or invoice, and/or potential matched optical image-based financial transaction data and customer account and/or invoice, is provided to the user for review and/or approval.

In one embodiment, once user reviews and/or approves the correlation of the optical image-based financial transaction data associated with the check and the customer account and/or invoice, a payment entry is automatically generated. In one embodiment, the check-based payment represented by the check is then automatically credited to the customer account and the customer account balance is transformed to reflect the check-based payment, and/or the status of an associated invoice is transformed to reflect the check-based payment, e.g., the invoice is marked as paid, or partially paid.

In one embodiment, once user reviews and/or approves the correlation of the optical image-based financial transaction data associated with the check and the customer account and/or invoice, a payment entry is automatically generated within, and/or through, the business financial management system associated with the process for automatic correlation of check-based payments to customer accounts and/or invoices. In one embodiment, the check-based payment represented by the check is then automatically credited to the customer account and the customer account balance is transformed to reflect the check-based payment, and/or the status of an associated invoice is transformed to reflect the check-based payment, e.g., the invoice is marked as paid, or partially paid within, or through, the business financial management system associated with the process for automatic correlation of check-based payments to customer accounts and/or invoices.

Hardware System Architecture

FIG. 1 is a block diagram of an exemplary hardware architecture for implementing one embodiment of a process for automatic correlation of check-based payments to customer accounts and/or invoices, such as exemplary process 200 (FIG. 2) discussed herein, that, returning to FIG. 1, includes: a business computing system 100, e.g., a first computing system associated with a business using process 200; a provider computing system 120, e.g., a second computing system associated with a provider of process 200; a Financial Institution (FI) computing system, FI computing system 150, e.g., a third computing system associated with a financial institution hosting on-line banking services; and communications links 141, 143, and 145.

As seen in FIG. 1, business computing system 100 typically includes a central processing unit (CPU) 101, a communications interface 106, and a memory system 103. In various embodiments, business computing system 100 can be any computing system discussed herein, and/or as known in the art at the time of filing, and/or as developed after the time of filing.

As noted above, as used herein, the term "computing system" includes, but is not limited to: a desktop computing system; a mobile computing system; a workstation; a two-way pager; a cellular telephone; a smart phone; a digital wireless telephone; a tablet computing system; a notebook computing system; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, as used herein, the term "mobile computing system" and "mobile device" are used interchangeably to denote a sub-set of the term "computing system" including, but not limited to: a portable computer; a tablet computing system; a notebook computing system; a laptop computing system; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

As also noted above, in one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, memory system 103 includes all, or part, of a process for automatic correlation of check-based payments to customer accounts and/or invoices, shown as process 200 in FIG. 1.

In one embodiment, memory system 103 includes all, or part, of a financial management system 180, such as any computing system implemented financial management system discussed herein, known in the art at the time of filing, and/or as developed thereafter.

In one embodiment, financial management system 180 is a business financial management system. Herein, a business financial management system can be, but is not limited to, any data management system implemented on a computing system and/or accessed through a network that gathers business financial data, including business financial transactional data, from one or more sources and/or has the capability to analyze, process, and categorize at least part of the business financial data.

As used herein, the term business financial management system includes, but is not limited to: computing system implemented, and/or online, business financial management systems, packages, programs, modules, or applications; computing system implemented, and/or online, business tax preparation systems, packages, programs, modules, or applications; computing system implemented, and/or online, business accounting and/or invoicing systems, packages, programs, modules, or applications; and various other business electronic data management systems, packages, programs, modules, or applications, whether known at the time of filling or as developed later.

Specific examples of business financial management systems include, but are not limited to: QuickBooks™, available from Intuit, Inc. of Mountain View, Calif.; QuickBooks Online™, available from Intuit, Inc. of Mountain View, Calif.; and/or various other business financial management systems discussed herein, and/or known to those of skill in the art at the time of filing, and/or as developed after the time of filing.

In one embodiment, memory system 103 includes check optical image data 153 representing an optical image of a check used for a check-based financial transaction, such as a customer of the business making a payment for products and/or services to the business.

Herein the term "check" includes any document or other mechanism used as a payment means associated with a financial transaction. As specific examples, herein the term "check" includes, but is not limited to, a personal check, a business check, a money order, a cashier's check, or any other form of payment used in any financial transaction.

In various embodiments, the check is handwritten. In other embodiments, the check is printed, and/or otherwise, machine generated. In various embodiments, the check includes handwritten or printed check-based financial transaction data, such as handwritten or printed data indicating the party writing the check, i.e., handwritten or printed data indicating the payor, handwritten or printed data indicating the payee, handwritten or printed data indicating the payment amount, handwritten or printed data indicating the date, handwritten or printed data indicating the bank account number, handwritten or printed data indicating the routing number, handwritten or printed memo data, etc.

In one embodiment, check optical image data 153 is obtained through, or provided to, financial management system 180.

In one embodiment, check optical image data 153 is obtained from FI computing system 150 associated with a financial institution such as a bank or credit union associated with the business and/or financial management system 180.

Currently many financial institutions provide various on-line, or web-based, account access and interaction features. Currently, these on-line, or web-based, account access and interaction features typically include providing the user access to a listing of financial tractions involving the user's accounts, such as payments made into the accounts and withdraws made from the accounts. In addition, many financial institutions now include optical images of checks, such as check optical image data 153, associated the listed financial transactions.

In one embodiment, check optical image data 153 is obtained from the FI computing system 150 using electronic data transfer systems such as the Open Financial Exchange (OFX) specification, or various other systems for transferring financial transaction data, and communications channel 141.

In other embodiments, check optical image data 153 is obtained using any method, means, process, or procedure for obtaining the optical image of a check as discussed herein, and/or as known in the art at the time of filing, and/or as developed after the time of filing.

As seen in FIG. 1, in one embodiment, memory 103 also includes Optical Character Recognition (OCR) capability 181. In one embodiment OCR capability 181 is used to extract optical image-based financial transaction data 182 from check optical image data 153 by transforming the handwritten, or printed, check-based financial transaction data included in check optical image data 153 into electronic optical image-based financial transaction data 182 readable/usable by financial management system 180, and/or one or more processors, such as CPU 101 or 121, in the same way electronic transaction data for electronic transactions is currently processed.

In one embodiment, optical image-based financial transaction data 182 includes various data such as, but not limited to, one or more of: data indicating the payor name; data indicating the check amount; data indicating the customer bank account upon which the check will be drawn; data indicating a customer account associated with the payor written/printed on the check; and/or data indicating an associated invoice number written/printed on the check.

In one embodiment, memory system 103 and financial management system 180 includes customer account/invoice data 185 indicating various customer accounts and invoices generated by, or associated with, financial management system 180.

As discussed below, in one embodiment, optical image-based financial transaction data 182 is used to match, or correlate, the check associated with optical image-based financial transaction data 182 to a customer account and/or invoice of customer account/invoice data 185 and to generate correlation data 187 indicating the correlation, or potential correlation of the check associated with optical image-based financial transaction data 182 to a customer account and/or invoice of customer account/invoice data 185.

In various embodiments, computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, business computing system 100, whether available or known at the time of filing or as later developed.

As also seen in FIG. 1, provider computing system 120 typically includes a central processing unit (CPUs) 121, communications interface 122, and a memory system 123.

In various embodiments, provider computing system 120 is an optional web-based or remote access system that performs any, or all, of the functions described above with respect to business computing system 100 in a remote or web-based architecture and/or replaces components/functions described above with respect to business computing system 100.

In various embodiments, provider computing system 120 can be any computing system discussed herein, and/or as known in the art at the time of filing, and/or as developed after the time of filing.

In one embodiment, memory system 123 includes all, or part, of a process for automatic correlation of check-based payments to customer accounts and/or invoices, shown as process 200 in FIG. 1.

In one embodiment, memory system 123 includes all, or part, of a financial management system 180, such as any web-based or on-line financial management system, discussed herein, known in the art at the time of filing, and/or as developed thereafter. In one embodiment, financial management system 180 is any business financial management system discussed herein, known in the art at the time of filing, and/or as developed thereafter.

In one embodiment, memory system 123 includes check optical image data 153 representing an optical image of a check used for a check-based financial transaction, such as a customer of the business making a payment for products and/or services to the business.

In one embodiment, check optical image data 153 is obtained through, or provided to, financial management system 180.

In one embodiment, check optical image data 153 is obtained from FI computing system 150 associated with a financial institution such as a bank or credit union associated with the business and/or financial management system 180 using communications channel 143.

As seen in FIG. 1, in one embodiment, memory 123 also includes Optical Character Recognition (OCR) capability 181. In one embodiment OCR capability 181 is used to extract optical image-based financial transaction data 182 from check optical image data 153 by transforming the handwritten, or printed, check-based financial transaction data included in check optical image data 153 into electronic optical image-based financial transaction data readable 182 usable by financial management system 180, and/or one or more processors, such as CPU 101 or 121, in the same way electronic transaction data for electronic transactions is currently processed.

In one embodiment, optical image-based financial transaction data 182 includes various data such as, but not limited to, one or more of: data indicating the payor name; data indicating the check amount; data indicating the customer bank account upon which the check will be drawn; data indicating a customer account associated with the payor written/printed on the check; and/or data indicating an associated invoice number written/printed on the check.

In one embodiment, memory system 123 and financial management system 180 include customer account/invoice data 185 indicating various customer accounts and invoices generated by, or associated with, financial management system 180.

As discussed below, in one embodiment, optical image-based financial transaction data 182 and customer account/invoice data 185 are used as inputs to analysis/correlation module 124. In one embodiment, analysis/correlation module 124 is used to match, or correlate, the check associated with optical image-based financial transaction data 182 to a customer account and/or invoice of customer account/invoice data 185 and to generate correlation data 187 indicating the correlation, or potential correlation, of the check associated with optical image-based financial transaction data 182 to a customer account and/or invoice of customer account/invoice data 185. In one embodiment, correlation data 187 is then sent to business computing system 100 via communications channel 145.

In various embodiments, provider computing system 120 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider computing system 120, whether available or known at the time of filing or as later developed.

In one embodiment, computing systems 100, 120, and 150 are linked together via communications channels 141, 143, and 145. In various embodiments, any, or all, of communications channels 141, 143, and 145 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100, 120, and 150 are part of a cloud computing environment.

Those of skill in the art will readily recognize that the components shown in FIG. 1, and their respective sub-components, are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100, 120, and 150 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of computing systems 100, 120, and 150 may be located remotely from their respective system and accessed via communication channels 141, 143, and 145. In addition, the particular type of, and configuration of, computing systems 100, 120, and 150 are not relevant.

As discussed in more detail below, in one embodiment, a process for automatic correlation of check-based payments to customer accounts and/or invoices, and/or a financial management system, and/or data associated with one or more users, is stored, in whole, or in part, in one or more memory systems, and/or cache memories, associated with one or more computing systems. As used herein, a memory refers to a volatile memory, a non-volatile memory, or any combination of the two.

Although a process for automatic correlation of check-based payments to customer accounts and/or invoices, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for automatic correlation of check-based payments to customer accounts and/or invoices, and/or a financial management system, is/are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for automatic correlation of check-based payments to customer accounts and/or invoices, and/or a financial management system, is/are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for automatic correlation of check-based payments to customer accounts and/or invoices, and/or a person and/or entity that interfaces with, and/or to whom information is provided by, a process for automatic correlation of check-based payments to customer accounts and/or invoices, and/or a legal guardian of person and/or entity that interfaces with, and/or to whom information is provided by, a process for automatic correlation of check-based payments to customer accounts and/or invoices, and/or an authorized agent of any party and/or person and/or entity that interfaces with, and/or to whom information is provided by, a process for automatic correlation of check-based payments to customer accounts and/or invoices.

In accordance with one embodiment, a system and method for automatic correlation of check-based payments to customer accounts and/or invoices includes a process for automatic correlation of check-based payments to customer accounts and/or invoices whereby an optical image of a check submitted to a business as part a check-based financial transaction is obtained.

In one embodiment, the optical image of the check is scanned using Optical Character Recognition (OCR) technology to obtain optical image-based financial transaction data such as, but not limited to, one or more of: the payor name; the check amount; the customer bank account upon which the check will be drawn; a customer account associated with the payor written on the check; and/or an associated invoice number written on the check.

In one embodiment, the optical image-based financial transaction data is then used to automatically match, or correlate, the check to a customer account and/or invoice.

In one embodiment, pending user review and/or approval, a payment entry is then automatically generated and the check-based payment represented by the check is automatically credited to the customer account and the customer account balance is transformed to reflect the check-based payment, and/or the status of an associated invoice is transformed to reflect the check-based payment, e.g., the invoice is marked as paid, or partially paid.

Figure 2:
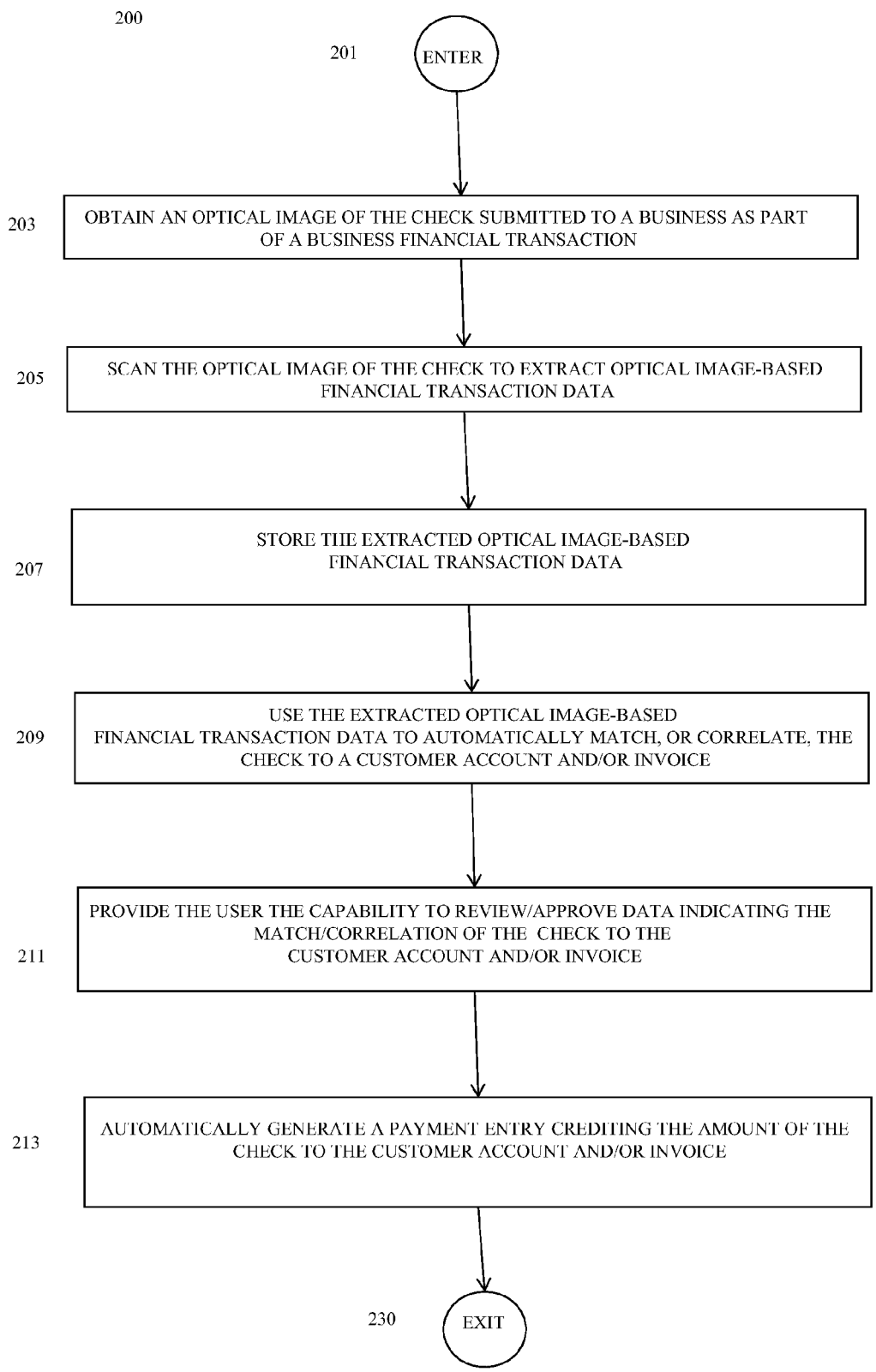
FIG. 2 is a flow chart depicting a process for automatic correlation of check-based payments to customer accounts and/or invoices in accordance with one embodiment.

FIG. 2 is a flow chart depicting a process for automatic correlation of check-based payments to customer accounts and/or invoices 200 in accordance with one embodiment.

In one embodiment, process for automatic correlation of check-based payments to customer accounts and/or invoices 200 is implemented on one or more computing systems, such as business computing system 100 and/or provider computing system 120 of FIG. 1, as part of, and/or is associated with, a business financial management system, such as financial management system 180 of FIG. 1.

Returning to FIG. 2, in one embodiment, process for automatic correlation of check-based payments to customer accounts and/or invoices 200 is implemented on one or more computing systems, such as business computing system 100 and/or provider computing system 120 of FIG. 1, as an add-on module or functionality associated with a business financial management system, such as financial management system 180 of FIG. 1.

Returning to FIG. 2, in one embodiment, process for automatic correlation of check-based payments to customer accounts and/or invoices 200 is a standalone application implemented on one or more computing systems such as business computing system 100 and/or provider computing system 120 of FIG. 1.

As used herein, the term "computing system" includes, but is not limited to: a desktop computing system; a mobile computing system; a workstation; a two-way pager; a cellular telephone; a smart phone; a digital wireless telephone; a tablet computing system; a notebook computing system; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile computing system" and "mobile device" are used interchangeably to denote a sub-set of the term "computing system" including, but not limited to: a portable computer; a tablet computing system; a notebook computing system; a laptop computing system; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Herein, a business financial management system can be, but is not limited to, any data management system implemented on a computing system and/or accessed through a network that gathers business financial data, including business financial transactional data, from one or more sources and/or has the capability to analyze, process, and categorize at least part of the business financial data.

As used herein, the term business financial management system includes, but is not limited to: computing system implemented, and/or online, business financial management systems, packages, programs, modules, or applications; computing system implemented, and/or online, business tax preparation systems, packages, programs, modules, or applications; computing system implemented, and/or online, business accounting and/or invoicing systems, packages, programs, modules, or applications; and various other business electronic data management systems, packages, programs, modules, or applications, whether known at the time of filling or as developed later.

Specific examples of business financial management systems include, but are not limited to: QuickBooks™, available from Intuit, Inc. of Mountain View, Calif.; QuickBooks On-line™, available from Intuit, Inc. of Mountain View, Calif.; and/or various other business financial management systems discussed herein, and/or known to those of skill in the art at the time of filing, and/or as developed after the time of filing.

Returning to FIG. 2, in one embodiment, process for automatic correlation of check-based payments to customer accounts and/or invoices 200 begins at ENTER OPERATION 201 of FIG. 2 and process flow proceeds to OBTAIN AN OPTICAL IMAGE OF THE CHECK SUBMITTED TO A BUSINESS AS PART OF A BUSINESS FINANCIAL TRANSACTION OPERATION 203.

In one embodiment, at OBTAIN AN OPTICAL IMAGE OF THE CHECK SUBMITTED TO A BUSINESS AS PART OF A BUSINESS FINANCIAL TRANSACTION OPERATION 203 an optical image of a check submitted to a business as part a check-based financial transaction is obtained.

Herein the term "check" includes any document or other mechanism used as a payment means associated with a financial transaction. As specific examples, herein the term "check" includes, but is not limited to, a personal check, a business check, a money order, a cashier's check, or any other form of payment used in any financial transaction.

In various embodiments, the check is handwritten. In other embodiments, the check is printed, and/or otherwise, machine generated. In various embodiments, the check includes handwritten or printed check-based financial transaction data, such as handwritten or printed data indicating the party writing the check, i.e., handwritten or printed data indicating the payor, handwritten or printed data indicating the payee, handwritten or printed data indicating the payment amount, handwritten or printed data indicating the date, handwritten or printed data indicating the bank account number, handwritten or printed data indicating the routing number, handwritten or printed memo data, etc.

In one embodiment, at OBTAIN AN OPTICAL IMAGE OF THE CHECK SUBMITTED TO A BUSINESS AS PART OF A BUSINESS FINANCIAL TRANSACTION OPERATION 203 the optical image of the check, such as check optical image data 153 of FIG. 1, submitted to the business as part a check-based financial transaction is obtained through, or provided to, the business financial management system, such as financial management system 180 of FIG. 1, associated with process for automatic correlation of check-based payments to customer accounts and/or invoices 200 (FIG. 2).

In one embodiment, at OBTAIN AN OPTICAL IMAGE OF THE CHECK SUBMITTED TO A BUSINESS AS PART OF A BUSINESS FINANCIAL TRANSACTION OPERATION 203 the optical image of the check submitted to the business as part a check-based financial transaction is obtained from a financial institution, and/or financial institution computing system such as financial institution computing system 150 of FIG. 1, associated with a financial institution such as a bank or credit union associated with the business and/or the business financial management system, associated with process for automatic correlation of check-based payments to customer accounts and/or invoices 200 (FIG. 2).

Currently many financial institutions provide various on-line, or web-based, account access and interaction features. Currently, these on-line, or web-based, account access and interaction features typically include providing the user access to a listing of financial tractions involving the user's accounts, such as payments made into the accounts and withdraws made from the accounts. In addition, many financial institutions now include optical images of checks associated the listed financial transactions.

In one embodiment, at OBTAIN AN OPTICAL IMAGE OF THE CHECK SUBMITTED TO A BUSINESS AS PART OF A BUSINESS FINANCIAL TRANSACTION OPERATION 203 the optical image of the check submitted to the business as part a check-based financial transaction and deposited into a financial institution account associated with the business is obtained from the financial institution using electronic data transfer systems such as the Open Financial Exchange (OFX) specification, or various other systems for transferring financial transaction data.

In one embodiment, at OBTAIN AN OPTICAL IMAGE OF THE CHECK SUBMITTED TO A BUSINESS AS PART OF A BUSINESS FINANCIAL TRANSACTION OPERATION 203 the optical image of the check submitted to the business as part a check-based financial transaction and deposited into a financial institution account associated with the business is obtained from the financial institution through the business financial management system associated with process for automatic correlation of check-based payments to customer accounts and/or invoices 200.

In other embodiments, at OBTAIN AN OPTICAL IMAGE OF THE CHECK SUBMITTED TO A BUSINESS AS PART OF A BUSINESS FINANCIAL TRANSACTION OPERATION 203 the optical image of the check submitted to the business as part a check-based financial transaction is obtained by process for automatic correlation of check-based payments to customer accounts and/or invoices 200, and/or the business financial management system associated with process for automatic correlation of check-based payments to customer accounts and/or invoices 200, using any method, means, process, or procedure for obtaining the optical image of a check as discussed herein, and/or as known in the art at the time of filing, and/or as developed after the time of filing.

In one embodiment, once an optical image of a check submitted to a business as part a check-based financial transaction is obtained at OBTAIN AN OPTICAL IMAGE OF THE CHECK SUBMITTED TO A BUSINESS AS PART OF A BUSINESS FINANCIAL TRANSACTION OPERATION 203 process flow proceeds to SCAN THE OPTICAL IMAGE OF THE CHECK TO EXTRACT OPTICAL IMAGE-BASED FINANCIAL TRANSACTION DATA OPERATION 205.

In one embodiment, at SCAN THE OPTICAL IMAGE OF THE CHECK TO EXTRACT OPTICAL IMAGE-BASED FINANCIAL TRANSACTION DATA OPERATION 205 the optical image of the check of OBTAIN AN OPTICAL IMAGE OF THE CHECK SUBMITTED TO A BUSINESS AS PART OF A BUSINESS FINANCIAL TRANSACTION OPERATION 203 is scanned using Optical Character Recognition (OCR) technology, and/or any similar pattern matching technology to extract optical image-based financial transaction data from the optical image of the check.

In one embodiment, at SCAN THE OPTICAL IMAGE OF THE CHECK TO EXTRACT OPTICAL IMAGE-BASED FINANCIAL TRANSACTION DATA OPERATION 205 OCR technology, and/or pattern matching technology, such as OCR capability 181 of FIG. 1, is used to extract optical image-based financial transaction data, such as optical image-based financial transaction data 182 of FIG. 1, from the optical image of the check data, such as check optical image data 153 of FIG. 1, by transforming the handwritten, or printed, check-based financial transaction data included in the obtained optical image of the check data, such as check optical image data 153 of FIG. 1, into electronic optical image-based financial transaction data, such as optical image-based financial transaction data 182 of FIG. 1, readable, and usable, by a business financial management system, such as financial management system 180 of FIG. 1, and/or one or more processors, such as CPU 101 and/or CPU 121 of FIG. 1, in the same way electronic transaction data for electronic transactions is currently processed.

Returning to FIG. 2, in one embodiment, the optical image-based financial transaction data of SCAN THE OPTICAL IMAGE OF THE CHECK TO EXTRACT OPTICAL IMAGE-BASED FINANCIAL TRANSACTION DATA OPERATION 205 includes various data such as, but not limited to, one or more of: data indicating the payor name; data indicating the check amount; data indicating the customer bank account upon which the check will be drawn; data indicating a customer account associated with the payor written on the check; and/or data indicating an associated invoice number written on the check.

In one embodiment, once the optical image of the check of OBTAIN AN OPTICAL IMAGE OF THE CHECK SUBMITTED TO A BUSINESS AS PART OF A BUSINESS FINANCIAL TRANSACTION OPERATION 203 is scanned using Optical Character Recognition (OCR) technology, and/or any similar pattern matching technology, to extract optical image-based financial transaction data from the optical image of the check at SCAN THE OPTICAL IMAGE OF THE CHECK TO EXTRACT OPTICAL IMAGE-BASED FINANCIAL TRANSACTION DATA OPERATION 205, process flow proceeds to STORE THE EXTRACTED OPTICAL IMAGE-BASED FINANCIAL TRANSACTION DATA OPERATION 207.

In one embodiment, at STORE THE EXTRACTED OPTICAL IMAGE-BASED FINANCIAL TRANSACTION DATA OPERATION 207 the extracted optical image-based financial transaction data of SCAN THE OPTICAL IMAGE OF THE CHECK TO EXTRACT OPTICAL IMAGE-BASED FINANCIAL TRANSACTION DATA OPERATION 205 is stored.

In one embodiment, at STORE THE EXTRACTED OPTICAL IMAGE-BASED FINANCIAL TRANSACTION DATA OPERATION 207 the extracted optical image-based financial transaction data of SCAN THE OPTICAL IMAGE OF THE CHECK TO EXTRACT OPTICAL IMAGE-BASED FINANCIAL TRANSACTION DATA OPERATION 205 is stored using any method, means, mechanism, process, procedure, and/or system for storing data as discussed herein, and/or as known in the art at the time of filing, and/or as developed after the time of filing.

In one embodiment, once the extracted optical image-based financial transaction data of SCAN THE OPTICAL IMAGE OF THE CHECK TO EXTRACT OPTICAL IMAGE-BASED FINANCIAL TRANSACTION DATA OPERATION 205 is stored at STORE THE EXTRACTED OPTICAL IMAGE-BASED FINANCIAL TRANSACTION DATA OPERATION 207, process flow proceeds to USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data of STORE THE EXTRACTED OPTICAL IMAGE-BASED FINANCIAL TRANSACTION DATA OPERATION 207 is used to match, or correlate, the check of OBTAIN AN OPTICAL IMAGE OF THE CHECK SUBMITTED TO A BUSINESS AS PART OF A BUSINESS FINANCIAL TRANSACTION OPERATION 203 to a customer account and/or invoice.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data, such as optical image-based financial transaction data 182 of FIG. 1, is used to match, or correlate, the check of OBTAIN AN OPTICAL IMAGE OF THE CHECK SUBMITTED TO A BUSINESS AS PART OF A BUSINESS FINANCIAL TRANSACTION OPERATION 203 to a customer account and/or invoice represented by customer account/invoice data, such as customer account/invoice data 185 of FIG. 1, associated with a business financial management system, such as financial management system 180 of FIG. 1, using an analysis/correlation module, such as analysis/correlation module 124 of FIG. 1.

Returning to FIG. 2, in one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data is provided to the business financial management system associated with process for automatic correlation of check-based payments to customer accounts and/or invoices 200 and is used to match, or correlate, the check to a customer account within the business financial management system associated with process for automatic correlation of check-based payments to customer accounts and/or invoices 200 and/or an invoice, or invoices, generated by the business financial management system associated with process for automatic correlation of check-based payments to customer accounts and/or invoices 200.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data is provided to the business financial management system associated with process for automatic correlation of check-based payments to customer accounts and/or invoices 200 and is used to match, or correlate, the check to a customer account and/or invoice under the direction of one or more processors, such as CPU 101 and/or CPU 121, associated with one or more computing systems, such as business computing system 100 and/or provider computing system 120 of FIG. 1.

Returning to FIG. 2, in one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data indicating the payor name associated with the check is used, at least in part, to match, or correlate, the check to a customer account and/or invoice under the direction of one or more processors associated with one or more computing systems.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/

OR INVOICE OPERATION 209 the optical image-based financial transaction data indicating the amount associated with the check is used, at least in part, to match, or correlate, the check to a customer account and/or invoice under the direction of one or more processors associated with one or more computing systems.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data indicating the customer bank account upon which the check will be drawn is used, at least in part, to match, or correlate, the check to a customer account and/or invoice under the direction of one or more processors associated with one or more computing systems.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data indicating a customer account associated with the payor as written or printed on the check is used, at least in part, to match, or correlate, the check to a customer account and/or invoice under the direction of one or more processors associated with one or more computing systems.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 the optical image-based financial transaction data indicating an associated invoice number as written or printed on the check is used, at least in part, to match, or correlate, the check to a customer account and/or invoice under the direction of one or more processors associated with one or more computing systems.

In various embodiments, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 any combination of one or more of the optical image-based financial transaction data discussed above, and/or any other optical image-based financial transaction data discussed herein, and/or as known in the art at the time of filing, and/or as developed/made available after the time of filing is used, at least in part, to match, or correlate, the check to a customer account and/or invoice under the direction of one or more processors associated with one or more computing systems.

In various embodiments, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 a margin of optical image-based financial transaction data and customer account and/or invoice match error is defined such that a near match between the optical image-based financial transaction data and the customer account and/or invoice is identified as a potential match subject to additional user review.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 a threshold optical image-based financial transaction data and customer account and/or invoice match score is defined and the optical image-based financial transaction data associated with a given check is assigned an optical image-based financial transaction data and customer account and/or invoice match score with respect to a potential customer account and/or invoice.

In one embodiment, at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209 optical image-based financial transaction data associated with a given check having an optical image-based financial transaction data and customer account and/or invoice match score greater than the threshold optical image-based financial transaction data and customer account and/or invoice match score is identified as a potential match subject to additional user review.

In one embodiment, once the optical image-based financial transaction data of STORE THE EXTRACTED OPTICAL IMAGE-BASED FINANCIAL TRANSACTION DATA OPERATION 207 is used to match, or correlate, the check of OBTAIN AN OPTICAL IMAGE OF THE CHECK SUBMITTED TO A BUSINESS AS PART OF A BUSINESS FINANCIAL TRANSACTION OPERATION 203 to a customer account and/or invoice at USE THE EXTRACTED OPTICAL IMAGE-BASED FINANCIAL TRANSACTION DATA TO AUTOMATICALLY MATCH, OR CORRELATE, THE CHECK TO A CUSTOMER ACCOUNT AND/OR INVOICE OPERATION 209, process flow proceeds to PROVIDE THE USER THE CAPABILITY TO REVIEW/APPROVE DATA INDICATING THE MATCH/CORRELATION OF THE CHECK TO THE CUSTOMER ACCOUNT AND/OR INVOICE OPERATION 211.

In one embodiment, at PROVIDE THE USER THE CAPABILITY TO REVIEW/APPROVE DATA INDICATING THE MATCH/CORRELATION OF THE CHECK TO THE CUSTOMER ACCOUNT AND/OR INVOICE OPERATION 211, a listing of the optical image-based financial transaction data associated with the check and the matched customer account and/or invoice, and/or potential matched optical image-based financial transaction data and customer account and/or invoice, is provided to the user for review and/or approval.

In one embodiment, at PROVIDE THE USER THE CAPABILITY TO REVIEW/APPROVE DATA INDICATING THE MATCH/CORRELATION OF THE CHECK TO THE CUSTOMER ACCOUNT AND/OR INVOICE OPERATION 211, a listing of the optical image-based financial transaction data associated with the check and the matched customer account and/or invoice, and/or potential matched optical image-based financial transaction data and customer account and/or invoice, such as correlation data 187 of FIG. 1, is provided to the user through a business computing system associated with the user, such as business computing system 100 of FIG. 1, for review and/or approval.

In one embodiment, once a listing of the optical image-based financial transaction data associated with the check and the matched customer account and/or invoice, and/or potential matched optical image-based financial transaction data and customer account and/or invoice, is provided to the user for review and/or approval at PROVIDE THE USER THE CAPABILITY TO REVIEW/APPROVE DATA INDICATING THE MATCH/CORRELATION OF THE CHECK TO THE CUSTOMER ACCOUNT AND/OR INVOICE OPERATION 211, process flow proceeds to AUTOMATICALLY GENERATE A PAYMENT ENTRY CREDITING THE AMOUNT OF THE CHECK TO THE CUSTOMER ACCOUNT AND/OR INVOICE OPERATION 213.

In one embodiment, at AUTOMATICALLY GENERATE A PAYMENT ENTRY CREDITING THE AMOUNT OF THE CHECK TO THE CUSTOMER ACCOUNT AND/OR INVOICE OPERATION 213 a payment entry is automatically generated.

In one embodiment, at AUTOMATICALLY GENERATE A PAYMENT ENTRY CREDITING THE AMOUNT OF THE CHECK TO THE CUSTOMER ACCOUNT AND/OR INVOICE OPERATION 213 the check-based payment represented by the check of OBTAIN AN OPTICAL IMAGE OF THE CHECK SUBMITTED TO A BUSINESS AS PART OF A BUSINESS FINANCIAL TRANSACTION OPERATION 203 is automatically credited to the customer account and the customer account balance is transformed to reflect the check-based payment, and/or the status of an associated invoice is transformed to reflect the check-based payment, e.g., the invoice is marked as paid, or partially paid.

In one embodiment, at AUTOMATICALLY GENERATE A PAYMENT ENTRY CREDITING THE AMOUNT OF THE CHECK TO THE CUSTOMER ACCOUNT AND/OR INVOICE OPERATION 213 a payment entry is automatically generated within, and/or through, the business financial management system associated with process for automatic correlation of check-based payments to customer accounts and/or invoices 200.

In one embodiment, at AUTOMATICALLY GENERATE A PAYMENT ENTRY CREDITING THE AMOUNT OF THE CHECK TO THE CUSTOMER ACCOUNT AND/OR INVOICE OPERATION 213 the check-based payment represented by the check is then automatically credited to the customer account and the customer account balance is transformed to reflect the check-based payment, and/or the status of an associated invoice is transformed to reflect the check-based payment, e.g., the invoice is marked as paid, or partially paid within, or through, the business financial management system associated with the process for automatic correlation of check-based payments to customer accounts and/or invoices.

In one embodiment, once a payment entry is automatically generated at AUTOMATICALLY GENERATE A PAYMENT ENTRY CREDITING THE AMOUNT OF THE CHECK TO THE CUSTOMER ACCOUNT AND/OR INVOICE OPERATION 213, process flow proceeds to EXIT OPERATION 230.

In one embodiment, at EXIT OPERATION 230 process for automatic correlation of check-based payments to customer accounts and/or invoices 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for automatic correlation of check-based payments to customer accounts and/or invoices 200, a business is provided an efficient and highly automated means for correlating check-based payments with the customer accounts and/or invoices to which the check-based payments should be applied and for making automated payment entries reflecting the check-based payments.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automatic correlation of check-based payments to customer accounts and/or invoices comprising:
    obtaining, at a business in payment for a good or service rendered by the business, an optical image of a check associated with the payment;
    scanning the optical image of the check to extract optical image-based payment data associated with the check;
    searching, using at least part of the optical image-based financial transaction data associated with the check, invoice data of the business to correlate the check to an invoice;
    generating a payment entry in a business financial management system, the payment entry at least crediting the check to the correlated invoice;
    reducing or eliminating, in response to generating the payment entry, by the business through the business financial management system, a balance owed to the business by a customer associated with the payment.

2. The method for automatic correlation of check-based payments to customer accounts and/or invoices of claim 1, wherein;
    the optical image of the check associated with the check-based financial transaction includes handwritten or printed check-based financial transaction data.

3. The method for automatic correlation of check-based payments to customer accounts and/or invoices of claim 2, wherein;
    at least part of the handwritten or printed check-based financial transaction data includes handwritten or printed check-based financial transaction data selected from the group of handwritten or printed check-based financial transaction data consisting of:
    handwritten or printed data indicating the party writing the check;
    handwritten or printed data indicating the payee;
    handwritten or printed data indicating the payment amount;
    handwritten or printed data indicating the date;
    handwritten or printed data indicating the bank account number associated with the check;
    handwritten or printed data indicating the routing number associated with the check; and
    handwritten or printed memo data.

4. The method for automatic correlation of check-based payments to customer accounts and/or invoices of claim 1, wherein;
    the optical image of the check associated with a check-based financial transaction is downloaded from a website associated with a financial institution.

5. The method for automatic correlation of check-based payments to customer accounts and/or invoices of claim 1, wherein;
    the optical image of the check is scanned to extract optical image-based financial transaction data associated with the check using Optical Character Recognition (OCR) technology.

6. The method for automatic correlation of check-based payments to customer accounts and/or invoices of claim 1, wherein;
    at least part of the optical image-based financial transaction data includes optical image-based financial transaction data selected from the group of optical image-based financial transaction data consisting of:
    data indicating the payor name;
    data indicating the check amount;
    data indicating the customer bank account upon which the check will be drawn;
    data indicating a customer account associated with the payor written on the check; and
    data indicating an associated invoice number written on the check.

7. The method for automatic correlation of check-based payments to customer accounts and/or invoices of claim 1, wherein;
    the customer account and/or invoice data is associated with a business financial management system.

8. The method for automatic correlation of check-based payments to customer accounts and/or invoices of claim 1, wherein;
    prior to generating payment entry crediting the check to the correlated customer account and/or invoice, a user of the method for automatic correlation of check-based payments to customer accounts and/or invoices is provided the opportunity to review and/or approve data indicating the correlation of the check to a customer account and/or invoice.

9. A computing system implemented process for automatic correlation of check-based payments to customer accounts and/or invoices comprising:
using one or more processors to obtain, at a business in payment for a good or service rendered by the business, an optical image of a check associated with the payment;
using one or more processors to scan the optical image of the check to extract optical image payment data associated with the check;
searching, using one or more processors and at least part of the optical image-based financial transaction data associated with the, invoice data of the business to correlate the check to an invoice;
using one or more processors to generate a payment entry in a business financial management system, the payment entry at least crediting the check to the correlated customer account and/or invoice; and
reducing or eliminating, in response to generating the payment entry, by the business through the business financial management system, a balance owed to the business by a customer associated with the payment.

10. The computing system implemented process for automatic correlation of check-based payments to customer accounts and/or invoices of claim 9, wherein;
the optical image of the check associated with the check-based financial transaction includes handwritten or printed check-based financial transaction data.

11. The computing system implemented process for automatic correlation of check-based payments to customer accounts and/or invoices of claim 10, wherein;
at least part of the handwritten or printed check-based financial transaction data includes handwritten or printed check-based financial transaction data selected from the group of handwritten or printed check-based financial transaction data consisting of:
handwritten or printed data indicating the party writing the check;
handwritten or printed data indicating the payee;
handwritten or printed data indicating the payment amount;
handwritten or printed data indicating the date;
handwritten or printed data indicating the bank account number associated with the check;
handwritten or printed data indicating the routing number associated with the check; and
handwritten or printed memo data.

12. The computing system implemented process for automatic correlation of check-based payments to customer accounts and/or invoices of claim 9, wherein;
the optical image of the check associated with a check-based financial transaction is downloaded from a website associated with a financial institution.

13. The computing system implemented process for automatic correlation of check-based payments to customer accounts and/or invoices of claim 9, wherein;
the optical image of the check is scanned to extract optical image-based financial transaction data associated with the check using Optical Character Recognition (OCR) technology.

14. The computing system implemented process for automatic correlation of check-based payments to customer accounts and/or invoices of claim 9, wherein;
at least part of the optical image-based financial transaction data includes optical image-based financial transaction data selected from the group of optical image-based financial transaction data consisting of:
data indicating the payor name;
data indicating the check amount;
data indicating the customer bank account upon which the check will be drawn;
data indicating a customer account associated with the payor written on the check; and
data indication an associated invoice number written on the check.

15. The computing system implemented process for automatic correlation of check-based payments to customer accounts and/or invoices of claim 9, wherein;
the customer account and/or invoice data is associated with a business financial management system.

16. The computing system implemented process for automatic correlation of check-based payments to customer accounts and/or invoices of claim 9, wherein;
prior to generating payment entry crediting the check to the correlated customer account and/or invoice, a user of the computing system implemented process for automatic correlation of check-based payments to customer accounts and/or invoices is provided the opportunity to review and/or approve data indicating the correlation of the check to a customer account and/or invoice.

17. A system for automatic correlation of check-based payments to customer accounts and/or invoices comprising:
a check associated with a payment for a good or service rendered by a business;
an optical image of the check associated with the payment;
invoice data representing one or more invoices associated with a business; and
one or more processors associated with one or more computing systems, the one or more processors associated with one or more computing systems implementing at least part of a process for automatic correlation of check-based payments to customer accounts and/or invoices, the process for automatic correlation of check-based payments to customer accounts and/or invoices including:
using the one or more processors associated with one or more computing systems to obtain the optical image of the check associated with the check-based financial transaction;
using the one or more processors associated with one or more computing systems to scan the optical image of the check to extract optical image-based payment data associated with the check;
using the one or more processors associated with one or more computing systems and at least part of the optical image-based financial transaction data associated with the check to automatically search the invoice data of the business to correlate the check to an invoice; and
using the one or more processors associated with one or more computing systems to generate a payment entry in a business financial management system, the payment entry at least crediting the check to the correlated invoice;
reducing or eliminating, in response to generating the payment entry, by the business through the business financial management system, a balance owed to the business by a customer associated with the payment.

18. The system for automatic correlation of check-based payments to customer accounts and/or invoices of claim 17, wherein;

the optical image of the check associated with the check-based financial transaction includes handwritten or printed check-based financial transaction data.

19. The system for automatic correlation of check-based payments to customer accounts and/or invoices of claim 18, wherein;

at least part of the handwritten or printed check-based financial transaction data includes handwritten or printed check-based financial transaction data selected from the group of handwritten or printed check-based financial transaction data consisting of:

handwritten or printed data indication the party writing the check;

handwritten or printed data indicating the payee;

handwritten or printed data indicating the payment amount;

handwritten or printed data indicating the date;

handwritten or printed data indicating the bank account number associated with the check;

handwritten or printed data indicating the routing number associated with the check; and handwritten or printed memo data.

20. The system for automatic correlation of check-based payments to customer accounts and/or invoices of claim 17, wherein;

the optical image of the check associated with a check-based financial transaction is downloaded from a website associated with a financial institution.

21. The system for automatic correlation of check-based payments to customer accounts and/or invoices of claim 17, wherein;

the optical image of the check is scanned to extract optical image-based financial transaction data associated with the check using Optical Character Recognition (OCR) technology.

22. The system for automatic correlation of check-based payments to customer accounts and/or invoices of claim 17, wherein;

at least part of the optical image-based financial transaction data includes optical image-based financial transaction data selected from the group of optical image-based financial transaction data consisting of:

data indicating the payor name;

data indicating the check amount;

data indicating the customer bank account upon which the check will be drawn;

data indicating a customer account associated with the payor written on the check; and data indicating an associated invoice number written on the check.

23. The system for automatic correlation of check-based payments to customer accounts and/or invoices of claim 17, wherein;

the customer account and/or invoice data is associated with a business financial management system.

24. The system for automatic correlation of check-based payments to customer accounts and/or invoices of claim 17, wherein;

prior to generating payment entry crediting the check to the correlated customer account and/or invoice, a user of the system for automatic correlation of check-based payments to customer accounts and/or invoices is provided the opportunity to review and/or approve data indicating the correlation of the check to a customer account and/or invoice.

\* \* \* \* \*

UNITED STATES PATENT AND TRADEMARK OFFICE
CERTIFICATE OF CORRECTION

| | |
|---|---|
| PATENT NO. | : 8,798,354 B1 |
| APPLICATION NO. | : 13/455692 |
| DATED | : August 5, 2014 |
| INVENTOR(S) | : Breeana D. Bunzel et al. |

It is certified that error appears in the above-identified patent and that said Letters Patent is hereby corrected as shown below:

In the Claims

In Column 26, Line 9, Claim 14, replace "indication" with --indicating--.

Signed and Sealed this
Twenty-fourth Day of February, 2015

Michelle K. Lee
*Deputy Director of the United States Patent and Trademark Office*